(12) United States Patent
Ferrisi et al.

(10) Patent No.: US 11,325,809 B2
(45) Date of Patent: May 10, 2022

(54) MONITORING ROLLER GUIDE HEALTH

(71) Applicant: OTIS ELEVATOR COMPANY, Farmington, CT (US)

(72) Inventors: John Ferrisi, Avon, CT (US); Norbert Antony Murray Hootsmans, South Glastonbury, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 1085 days.

(21) Appl. No.: 15/925,112

(22) Filed: Mar. 19, 2018

(65) Prior Publication Data
US 2019/0284021 A1    Sep. 19, 2019

(51) Int. Cl.
| | |
|---|---|
| *B66B 7/04* | (2006.01) |
| *B66B 1/24* | (2006.01) |
| *B66B 1/30* | (2006.01) |
| *B66B 5/00* | (2006.01) |
| *G05B 19/042* | (2006.01) |
| *B66B 1/34* | (2006.01) |

(52) U.S. Cl.
CPC .......... *B66B 5/0037* (2013.01); *B66B 5/0025* (2013.01); *B66B 5/0031* (2013.01); *B66B 7/046* (2013.01); *G05B 19/0425* (2013.01); *B66B 1/3461* (2013.01); *B66B 1/3492* (2013.01)

(58) Field of Classification Search
USPC ......................................................... 187/393
See application file for complete search history.

(56) References Cited

U.S. PATENT DOCUMENTS

| | | | |
|---|---|---|---|
| 3,856,117 A | 12/1974 | Solymos | |
| 4,750,591 A | 6/1988 | Coste et al. | |
| 5,811,743 A * | 9/1998 | Kohara | ................... B66B 7/042 187/393 |
| 6,330,936 B1 | 12/2001 | Barreiro et al. | |
| 6,439,350 B1 | 8/2002 | Barreiro et al. | |
| 6,604,611 B2 | 8/2003 | Liu et al. | |
| 6,854,565 B2 | 2/2005 | Perala et al. | |
| 6,988,594 B2 | 1/2006 | Deplazes et al. | |
| 7,314,119 B2 * | 1/2008 | Husmann | ................ B66B 7/046 187/292 |
| 7,423,398 B2 | 9/2008 | Tyni et al. | |
| 7,503,435 B2 | 3/2009 | Tyni et al. | |
| 7,540,358 B2 * | 6/2009 | Okamoto | ................... B66B 5/04 187/394 |

(Continued)

FOREIGN PATENT DOCUMENTS

| | | |
|---|---|---|
| CN | 101096253 A | 1/2008 |
| CN | 102897633 A | 1/2013 |

(Continued)

OTHER PUBLICATIONS

European Search Report Application No. EP19162771; dated Mar. 18, 2020; pp. 12.

(Continued)

*Primary Examiner* — Christopher Uhlir
(74) *Attorney, Agent, or Firm* — Cantor Colburn LLP

(57) ABSTRACT

A guide for individual movement machinery. The guide includes a base, a frame and a monitoring system. The monitoring system includes arrays of sensors affixed to each of the base and the frame to respectively sense guide conditions and to generate readings accordingly.

19 Claims, 2 Drawing Sheets

(56) References Cited

U.S. PATENT DOCUMENTS

| | | | |
|---|---|---|---|
| 7,637,355 B2 | 12/2009 | Tyni | |
| 8,464,841 B2 | 6/2013 | Birrer et al. | |
| 8,893,858 B2 * | 11/2014 | Shi | B66B 5/0025 |
| | | | 187/391 |
| 9,248,993 B2 | 2/2016 | Studer | |
| 9,580,276 B2 | 2/2017 | Toutaoui | |
| 9,586,790 B2 | 3/2017 | Tyni et al. | |
| 9,604,818 B2 | 3/2017 | Kallioniemi et al. | |
| 2005/0145440 A1 | 7/2005 | Husmann et al. | |
| 2017/0305719 A1 | 10/2017 | Jetter et al. | |
| 2020/0346874 A1 * | 11/2020 | Onishi | G08B 25/08 |

FOREIGN PATENT DOCUMENTS

| | | |
|---|---|---|
| CN | 103318733 A | 9/2013 |
| CN | 204689304 U | 10/2015 |
| CN | 108382954 A | 8/2018 |
| WO | 2016126788 A1 | 8/2016 |

OTHER PUBLICATIONS

Isaac Skog, et al.: "A Smart Sensor Node fo rthe Internet-of Elevators-Non-Invasive Condition and Fault Monitoring" IEEE Sensors Journal, vol. No. 17. No. 16, Aug. 15, 2017. pp. 11.

\* cited by examiner

MONITORING ROLLER GUIDE HEALTH

BACKGROUND

The following description relates to elevator or escalator safety systems and, more specifically, to the monitoring of roller guide health affecting elevator performance.

Elevator roller guides operate in harsh environments. These harsh environments are characterized by relatively high temperatures, high loads and requirements for high speed rotational action. The elevator roller guides may, therefore, experience damage and/or degraded conditions over time. To prevent such damage and degraded conditions, elevator mechanics often need to periodically check the elevator roller guides for signs of wear. This typically requires that the corresponding elevator be shut down, which is costly and time consuming.

BRIEF DESCRIPTION

According to an aspect of the disclosure, a guide for individual movement machinery. The guide includes a base, a frame and a monitoring system. The monitoring system includes arrays of sensors affixed to each of the base and the frame to respectively sense guide conditions and to generate readings accordingly.

In accordance with additional or alternative embodiments, the frame includes lever arms coupled to the frame and lever arm control assemblies configured to limit movements of each of the lever arms relative to the frame, the guide further includes slider assemblies rotatably coupled to each of the lever arms, the lever arms include opposed front-to-back lever arms and a side-to-side lever arm and the slider assemblies include opposed front-to-back slider assemblies rotatably coupled to the front-to-back lever arms, respectively, and a side-to-side slider assembly rotatably coupled to the side-to-side lever arm.

In accordance with additional or alternative embodiments, the lever arm control assemblies each include at least one of a spring or damping unit and a mechanical stop.

In accordance with additional or alternative embodiments, the arrays of sensors include micro-electrical mechanical system (MEMS) devices in a size range of twenty micrometers to one millimeter.

In accordance with additional or alternative embodiments, the arrays of sensors include a base sensor array affixed to the base and additional sensor arrays respectively affixed to the frame.

In accordance with additional or alternative embodiments, the base sensor array is disposed at or near to a center of the base.

In accordance with additional or alternative embodiments, the base sensor array includes at least acceleration, tilt and rotation sensors.

In accordance with additional or alternative embodiments, the additional sensor arrays are respectively disposed proximate to slider assemblies at lever arms of the frame.

In accordance with additional or alternative embodiments, each of the additional sensor arrays includes at least acceleration, shock and vibration sensors.

In accordance with additional or alternative embodiments, an indicator is configured to display a status indication based on the readings.

In accordance with additional or alternative embodiments, the indicator includes light emitters, which are respectively associated with each of the roller guide conditions and which are configured to emit light of various colors to generate the status indication.

In accordance with additional or alternative embodiments, the indicator is communicative with at least one of an elevator system controller and an external computing device.

In accordance with additional or alternative embodiments, an elevator system is provided and includes at least first and second guides. The readings are generated from comparisons between complementarily sensed guide conditions of the at least first and second guides.

According to an aspect of the disclosure, an elevator system is provided for use in a structure formed to define a hoistway. The elevator system includes a hoistway rail extending along the hoistway, a drive system and an elevator car, which is movably disposed in the hoistway and drivable to move along the hoistway rail by the drive system. The elevator car includes one or more elevator roller guides that respectively engage with the hoistway rail and sensors. The sensors are affixed to each of the one or more of the elevator roller guides and are configured to sense elevator roller guide conditions and to generate readings accordingly.

In accordance with additional or alternative embodiments, the sensors include micro-electrical mechanical system (MEMS) devices in a size range of twenty micrometers to one millimeter.

In accordance with additional or alternative embodiments, the sensors are provided in arrays of sensors that include a base sensor array and lever arm sensor arrays. The base sensor array is affixed to a base of each of the one or more elevator roller guides and includes at least acceleration, tilt and rotation sensors. The lever arm sensor arrays are respectively affixed to each lever arm of each one of the one or more of the elevator roller guides and include at least acceleration, shock and vibration sensors.

In accordance with additional or alternative embodiments, an indicator is configured to display a status indication based on the readings.

In accordance with additional or alternative embodiments, an elevator system controller is configured to control at least the drive system based on the readings.

According to an aspect of the disclosure, a method of operating an elevator system for use in a structure formed to define a hoistway is provided. The elevator system includes a hoistway rail extending along the hoistway, a drive system and an elevator car, which is movably disposed in the hoistway and drivable to move along the hoistway rail by the drive system. The elevator car includes one or more elevator roller guides that respectively engage with the hoistway rail. The method includes affixing sensors to each of the one or more of the elevator roller guides, activating the sensors to sense elevator roller guide conditions during operations of the elevator system and to generate readings accordingly and controlling at least the drive system during the operations of the elevator system based on the readings.

In accordance with additional or alternative embodiments, the method further includes remote monitoring of the elevator system.

These and other advantages and features will become more apparent from the following description taken in conjunction with the drawings.

BRIEF DESCRIPTION OF THE DRAWINGS

The subject matter, which is regarded as the disclosure, is particularly pointed out and distinctly claimed in the claims at the conclusion of the specification. The foregoing and other features and advantages of the disclosure are apparent from the following detailed description taken in conjunction with the accompanying drawings in which:

These and other advantages and features will become more apparent from the following description taken in conjunction with the drawings.

DETAILED DESCRIPTION

As will be described below, an automated roller guide monitoring system is provided for use with a system for transporting one or more individuals or people, such as an elevator system, an escalator system, etc. The automated roller guide monitoring system is configured to detect, for example, specific problems with the elevator guidance system and could be employed in such a way as to permit or at least substantially reduce the elimination of the manual work of a field crew.

Figure 1:
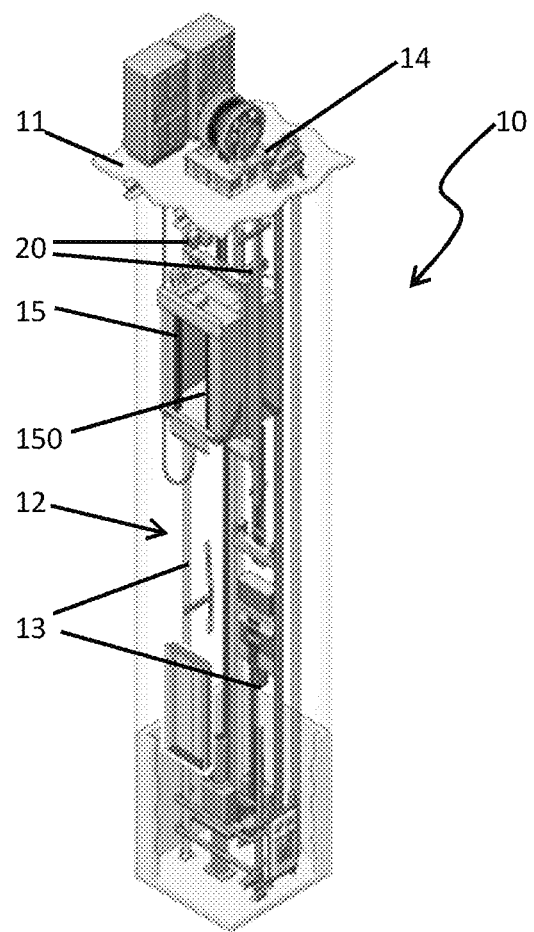
FIG. 1 is a perspective view of an elevator system in accordance with embodiments.

With reference to FIG. 1, an elevator system 10 in particular is provided for use in a structure 11, such as a multi-level building, which is formed to define a hoistway 12. The elevator system 10 includes a hoistway rail 13 extending along the hoistway 12, a drive system 14 and an elevator car 15. The elevator car 15 is movably disposed in the hoistway 12 and is drivable to move along the hoistway rail 13 by the drive system 14. The elevator car 15 includes an elevator car body 150, which is formed to accommodate one or more passengers and one or more elevator roller guides 20 (e.g., first and second elevator roller guides 20) that are coupled to the elevator car body 150 and respectively engage with the hoistway rail 13.

Figure 2:
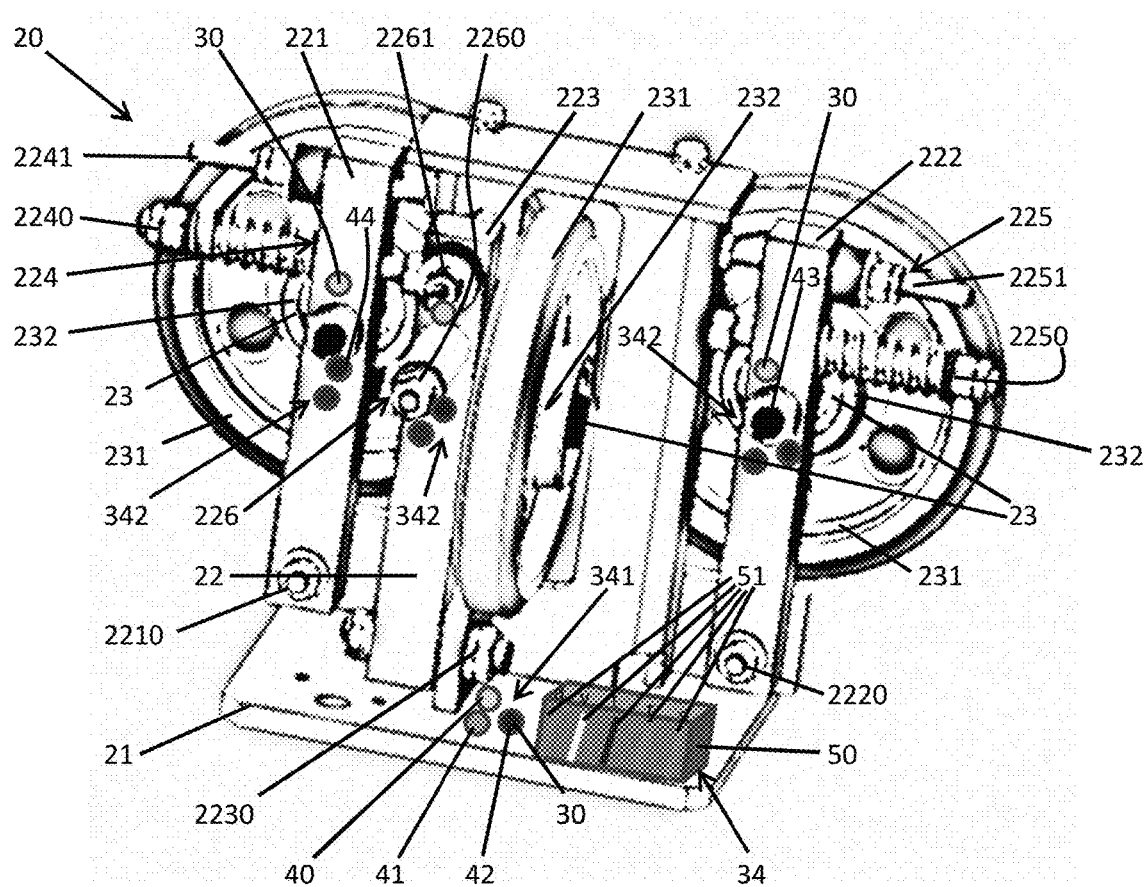
FIG. 2 is a perspective view of an elevator roller guide in accordance with embodiments.

With continued reference to FIG. 1 and with additional reference to FIG. 2, each elevator roller guide 20 includes, for example, a base 21, a frame 22 that is affixed to the base 21, slider assemblies 23 and a monitoring system 34. The base 21 is a generally planar and rigid feature that should be oriented in parallel with a floor and a ceiling of the elevator car body 150. The frame 22 is affixed to the base 21. The frame 22 includes first, second and third lever arms 221, 222 and 223 and first, second and third lever arm control assemblies 224, 225 and 226. The first and second lever arms 221 and 222 may be provided as opposed front-to-back lever arms and the third lever arm 226 may be provided as a side-to-side lever arm that is oriented orthogonally relative to the first and second lever arms 221 and 222.

It is to be understood that the embodiments of the elevator roller guide 20 described above and in the description below are merely exemplary and that other configurations are possible.

A lower portion of the first lever arm 221 is connected to a lower portion of the frame 22 via connection 2210. The first lever arm control assembly 224 includes at least one of a spring or damping unit 2240 and a mechanical stop 2241 and is coupled to an upper portion of the first lever arm 221 and an upper portion of the frame 22 such that some degree of movement of the first lever arm 221 relative to the frame 22 is permitted. Where the first lever arm 221 is provided as a front-to-back lever arm, the movement of the first lever arm 221 relative to the frame 22 is generally in the front-to-back plane about the connection 2210. The first lever arm control assembly 224 is configured to limit movements of the first lever arm 221 relative to the frame 22 and, more particularly, to limit the movements of the first lever arm 221 about the connection 2210 in the front-to-back plane relative to the frame 22.

A lower portion of the second lever arm 222 is connected to a lower portion of the frame 22 via connection 2220. The second lever arm control assembly 225 includes at least one of a spring or damping unit 2250 and a mechanical stop 2251 and is coupled to an upper portion of the second lever arm 222 and an upper portion of the frame 22 such that some degree of movement of the second lever arm 222 relative to the frame 22 is permitted. Where the second lever arm 222 is provided as a front-to-back lever arm, the movement of the second lever arm 222 relative to the frame 22 is generally in the front-to-back plane about the connection 2220. The second lever arm control assembly 225 is configured to limit movements of the second lever arm 222 relative to the frame 22 and, more particularly, to limit the movements of the second lever arm 222 about the connection 2220 in the front-to-back plane relative to the frame 22.

A lower portion of the third lever arm 223 is connected to a lower portion of the frame 22 via connection 2230. The third lever arm control assembly 226 includes at least one of a spring or damping unit 2260 and a mechanical stop 2261 and is coupled to an upper portion of the third lever arm 223 and an upper portion of the frame 22 such that some degree of movement of the third lever arm 223 relative to the frame 22 is permitted. Where the third lever arm 223 is provided as a side-to-side lever arm, the movement of the third lever arm 223 relative to the frame 22 is generally in the side-to-side plane about the connection 2230. The third lever arm control assembly 226 is configured to limit movements of the third lever arm 223 relative to the frame 22 and, more particularly, to limit the movements of the third lever arm 223 about the connection 2230 in the side-to-side plane relative to the frame 22.

The slider assemblies 23 are rotatably coupled to each of the first, second and third lever arms 221, 222 and 223 and are configured to engage with the hoistway rail 13 of FIG. 1 as the elevator car 15 moves through the hoistway 12. Each slider assembly 23 includes a rotatable wheel 231 and a bearing 232 by which the rotatable wheel 231 is coupled to one of the first, second and third lever arms 221, 22 and 223.

The monitoring system 34 includes sensors 30 that are affixed to each elevator roller guide 20. The sensors 30 may be provided as micro-electrical mechanical systems (MEMS) devices and can be provided with a size range of about twenty micrometers to about one millimeter. The sensors 30 are configured to sense elevator roller guide conditions and to generate readings accordingly without substantially or even minimally affecting a performance of the elevator roller guides 20. The sensors 30 are arranged in a base sensor array 341 and in additional or lever arm sensor arrays 342 (hereinafter referred to as simply "lever arm sensor arrays 342"). The sensors 30 of the base sensor array 341 are affixed to or embedded in the base 21 and the sensors 30 of the lever arm sensor arrays 342 are affixed to or embedded in each of the first, second and third lever arms 221, 222 and 223.

The use of MEMS devices for the sensors 30 is appropriate for health monitoring of elevator roller guides 20. With the sensors 30 being MEMS devices, they can pick-up relatively high vibration levels and frequency changes in the case of worn bearings, increased run out, misalignment of roller axes, etc. In particular, where the sensors 30 are provided as MEMS capacitive accelerometers (VC), the sensors 30 can be operated with a relatively small current and can function in an open-loop configuration. Thus, the sensors 30 can operate wirelessly for long terms and are portable, reliable and durable. They can monitor temperature, moisture, strain and other data continuously.

In accordance with embodiments, the base sensor array 341 may be disposed at or near to a center of the base 21 and may include at least acceleration sensors 40, tilt sensors 41 and rotation sensors 42. In accordance with embodiments, the lever arm sensor arrays 342 may be respectively disposed proximate to the slider assemblies 23 at each of the first, second and third lever arms 221, 222 and 223. Each of lever arm sensor arrays 342 may include at least acceleration sensors 40, shock sensors 43 and vibration sensors 44.

The acceleration sensors 40 serve to measure an acceleration in various directions of the base 21 or to measure a bearing acceleration of the bearing assembly 23 of the corresponding one of the first, second and third lever arms 221, 222 and 223. In an exemplary case, readings of any one of the acceleration sensors 40 of the first, second and third lever arms 221, 222 and 223 may be used to compute a bearing acceleration of the corresponding bearing assembly 23 in a noise/vibration fault diagnosis.

The tilt sensors 41 serve to measure a tilt of the base 21 to determine if the corresponding elevator roller guide 20 is parallel or plumb with respect to the hoistway rail 13 and/or the elevator car body 150. In some cases, such as where the elevator car 15 includes first and second elevator roller guides 20, readings of the tilt sensors 41 of each of the first and second elevator roller guides 20 can be compared with each other to determine whether one of the first and second elevator roller guides 20 is tilted or off-axis relative to the other. In other cases, such as where the elevator system 10 includes multiple elevator cars 15 and each elevator car 15 includes first and/or second elevator roller guides 20, readings of the tilt sensors 41 of each of the first and/or second elevator roller guides 20 of each elevator car 15 can be compared with each other to determine whether any of the first and second elevator roller guides 20 are tilted or off-axis relative to the others.

The rotation sensors 42 serve to measure a rotation of the base 21. Where the elevator car 15 includes first and second elevator roller guides 20, readings of the rotation sensors 42 of each of the first and second elevator roller guides 20 can be compared with each other to determine whether one of the first and second elevator roller guides 20 is misaligned. Where the elevator system 10 includes multiple elevator cars 15 and each elevator car 15 includes first and/or second elevator roller guides 20, readings of the rotation sensors 42 of each of the first and/or second elevator roller guides 20 of each elevator car 15 can be compared with each other to determine whether any of the first and second elevator roller guides 20 are misaligned.

The shock sensors 43 serve to measure shock and can be used to verify that the first, second and third lever arm control assemblies 224, 225 and 226 are set and calibrated correctly. The vibration sensors 44 serve to measure velocity, acceleration and/or displacement from vibration amplitudes and/or frequencies. Readings from the vibration sensors 44 can be employed to determine whether the elevator car 15 is subject to abnormal vibration frequencies that would be uncomfortable or indicative of a dangerous condition, for example.

The monitoring system 34 can further include an indicator 50. The indicator 50 can be affixed to the base 21 or the frame 22 and is configured to display a status indication based on the readings generated by the sensors 30.

Figure 3:
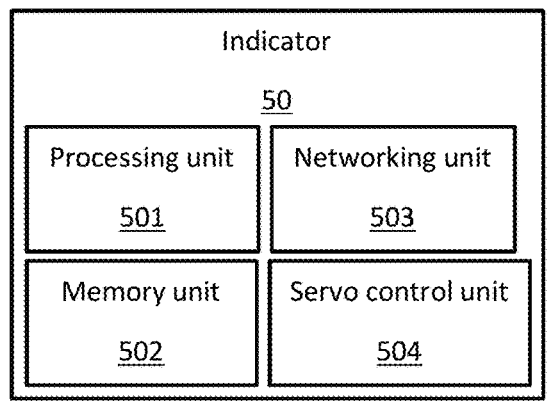
FIG. 3 is a schematic illustration of an indicator of the elevator roller guide of FIG. 2.

With continued reference to FIG. 2 and with additional reference to FIG. 3, the indicator 50 can include or be coupled to a processing unit 501, a memory unit 502, a networking unit 503 and, in some cases, a servo or electronic control unit 504. The processing unit 501, the memory unit 502, the networking unit 503 and, where applicable, the servo or electronic control unit 504 may be locally disposed with respect to the indicator, the elevator car 15 or the elevator system 10 or may be remote from the elevator system 10 entirely. In any case, the processing unit 501 is communicative with the sensors 30 and external computing devices 510 by way of the networking unit 503. Where the servo or electronic control unit 504 is available, the processing unit 501 can control various operations of the elevator system 10 (e.g., by stopping, slowing or speeding up the drive system 14). The memory unit 502 has executable instructions stored thereof, which are readable and executable by the processing unit 501. The executable instructions are configured such that, when they are read and executed by the processing unit 501, they cause the processing unit 501 to operate as described herein.

In accordance with embodiments, the indicator 50 can be affixed or disposed on the base 21 and may include light emitters 51. Each light emitter 51 can be respectively associated with a type of sensor 30 and/or with a roller guide condition that is sensed by one of the sensors 30. Thus, one light emitter 51 may be associated with acceleration, one light emitter 51 may be associated with tilt, one light emitter 51 may be associated with rotation, one light emitter 51 may be associated with shock and one light emitter 51 may be associated with vibration. Moreover, each light emitter 51 may be configured to emit light of various colors to generate the status indication (e.g., green for ok, yellow for a warning and red for an issue that needs to be resolved).

The processing unit 501 may be receptive of data reflective of readings of the sensors 30 from each of the sensors 30 via the networking unit 503 and configured to analyze the data to determine whether any of the roller guide conditions sensed by the sensors 30 are problematic. If not, the processing unit 501 controls the light emitters 51 directly or by way of the servo control unit 504 to emit the green lights. If any of the roller guide conditions are problematic, the processing unit 501 controls the corresponding light emitters 51 directly or by way of the servo or electronic control unit 504 to emit the appropriate color. In some cases, the processing unit 501 can determine that a roller guide condition is in effect which requires that the elevator system 10 be shut down or that the drive system 14 for the corresponding elevator car 15 needs to be shut down, slowed or sped up. In these instances, the processing unit 501 can control the elevator system 10 or the drive system 14 directly or by way of the servo or electronic control unit 504 accordingly.

Figure 4:
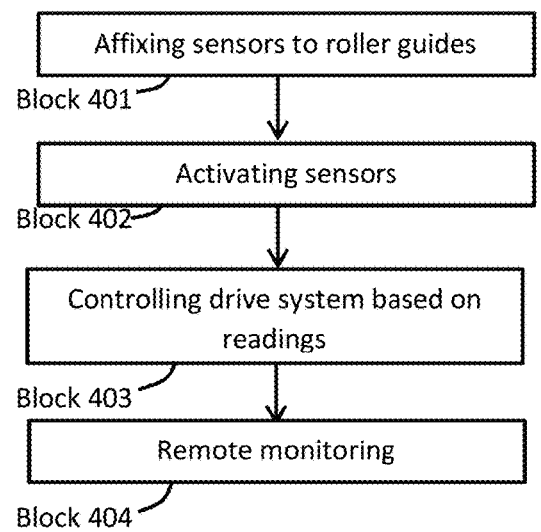
FIG. 4 is a flow diagram illustrating a method of operating an elevator system in accordance with embodiments.

With reference to FIG. 4, a method of operating an elevator system, such as the elevator system 10 described above is provided. The method includes affixing sensors to each of the one or more of the elevator roller guides (block 401), activating the sensors to sense elevator roller guide conditions during operations of the elevator system and to generate readings accordingly (block 402), controlling at least the drive system during the operations of the elevator system based on the readings (block 403) and remote monitoring of the elevator system (block 404).

Benefits of the features described herein are that an automated roller guide monitoring system is provided for use with an elevator system. In addition, the automated roller guide monitoring system detects, for example, specific problems with the elevator guidance system and could be employed in such a way as to permit the elimination or at least the substantial reduction of the manual work of a field crew.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A guide for individual movement machinery for an elevator car in an elevator system, the elevator system comprising a hoistway rail extending along a hoistway and the elevator car, which is movably disposed in and drivable along the hoistway rail, and the guide engaging with the hoistway rail and comprising:
   a base attached to the elevator car;
   a frame comprising lever arms; and
   a monitoring system comprising arrays of base and lever arm sensors comprising at least acceleration sensors and being embedded in each of the base and the lever arms of the frame to respectively sense guide conditions and to generate readings accordingly.

2. The guide according to claim 1, wherein:
   the frame comprises the lever arms, which are coupled to the frame, and lever arm control assemblies configured to limit movements of each of the lever arms relative to the frame,
   the guide further comprises slider assemblies rotatably coupled to each of the lever arms,
   the lever arms comprise opposed front-to-back lever arms and a side-to-side lever arm, and
   the slider assemblies comprise opposed front-to-back slider assemblies rotatably coupled to the front-to-back lever arms, respectively, and a side-to-side slider assembly rotatably coupled to the side-to-side lever arm.

3. The guide according to claim 2, wherein the lever arm control assemblies each comprise at least one of:
   a spring or damping unit; and
   a mechanical stop.

4. The guide according to claim 1, wherein the arrays of base and lever arm sensors comprise micro-electrical mechanical system (MEMS) devices in a size range of twenty micrometers to one millimeter.

5. The guide according to claim 1, wherein the arrays of base and lever arm sensors comprise:
   a base sensor array affixed to the base; and
   additional sensor arrays respectively affixed to the frame.

6. The guide according to claim 5, wherein the base sensor array is disposed at or near to a center of the base.

7. The guide according to claim 5, wherein the base sensor array comprises at least acceleration, tilt and rotation sensors.

8. The guide according to claim 5, wherein the additional sensor arrays are respectively disposed proximate to slider assemblies at lever arms of the frame.

9. The guide according to claim 5, wherein each of the additional sensor arrays comprises at least acceleration, shock and vibration sensors.

10. The guide according to claim 1, further comprising an indicator which is configured to display a status indication based on the readings.

11. The guide according to claim 10, wherein the indicator comprises light emitters, which are respectively associated with each of the guide conditions and which are configured to emit light of various colors to generate the status indication.

12. The guide according to claim 10, wherein the indicator is communicative with at least one of an elevator system controller and an external computing device.

13. An elevator system comprising at least first and second guides according to claim 1, wherein the readings are generated from comparisons between complementarily sensed guide conditions of the at least first and second guides.

14. An elevator system for use in a structure formed to define a hoistway, the elevator system comprising:
   a hoistway rail extending along the hoistway;
   a drive system; and
   an elevator car, which is movably disposed in the hoistway and drivable to move along the hoistway rail by the drive system, the elevator car comprising:
   one or more elevator roller guides that respectively engage with the hoistway rail; and
   sensors affixed to each of the one or more of the elevator roller guides and configured to sense elevator roller guide conditions and to generate readings accordingly,
   wherein the sensors are provided in arrays of sensors comprising:
   a base sensor array embedded in a base of each of the one or more elevator roller guides and comprising at least acceleration, tilt and rotation sensors; and
   lever arm sensor arrays respectively embedded in a lever arm of each one of the one or more of the elevator roller guides and comprising at least acceleration, shock and vibration sensors.

15. The elevator system according to claim 14, wherein the sensors comprise micro-electrical mechanical system (MEMS) devices in a size range of twenty micrometers to one millimeter.

16. The elevator system according to claim 14, further comprising an indicator which is configured to display a status indication based on the readings.

17. The elevator system according to claim 14, further comprising an elevator system controller which is configured to control at least the drive system based on the readings.

18. A method of operating an elevator system for use in a structure formed to define a hoistway,
   the elevator system comprising a hoistway rail extending along the hoistway, a drive system and an elevator car, which is movably disposed in the hoistway and drivable to move along the hoistway rail by the drive system, the elevator car comprising one or more elevator roller guides that respectively engage with the hoistway rail, and
   the method comprising:
   embedding sensors in a base of each of the one or more elevator roller guides and in a lever arm of each one of the one or more of the elevator roller guides;
   activating the sensors to sense elevator roller guide conditions during operations of the elevator system and to generate readings accordingly; and controlling at least the drive system during the operations of the elevator system based on the readings.

19. The method according to claim 18, further comprising remote monitoring of the elevator system.

* * * * *